(12) United States Patent
Woodring

(10) Patent No.: US 6,876,730 B1
(45) Date of Patent: Apr. 5, 2005

(54) SYSTEM AND METHOD FOR AUTOMATED TELE-WORK SERVICE

(75) Inventor: Larry D. Woodring, Decatur, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 539 days.

(21) Appl. No.: 09/749,967

(22) Filed: Dec. 28, 2000

(51) Int. Cl.[7] .............................................. H04M 15/00
(52) U.S. Cl. ......................... 379/114.28; 379/127.01; 379/126; 379/211.02; 379/207.16
(58) Field of Search ..................... 379/127.01, 127.03, 379/127.05, 211.02, 207.16, 211.01, 212.01, 114.01, 114.03, 114.21, 114.22, 114.23, 114.26, 114.38, 114.29, 115.01, 115.02, 121.01, 121.04, 121.05, 126, 127.06, 114.28, 114.05, 201.01, 201.02, 207.13, 207.15, 207.14, 211.03, 221.09, 221.12, 204.01, 201.07, 201.08; 455/405, 406

(56) References Cited

U.S. PATENT DOCUMENTS

| | | | | |
|---|---|---|---|---|
| 5,247,571 A | * | 9/1993 | Kay et al. ................... | 379/207 |
| 5,701,301 A | | 12/1997 | Weisser, Jr. ................. | 370/428 |
| 5,729,598 A | * | 3/1998 | Kay ........................... | 379/115 |
| 6,067,456 A | * | 5/2000 | Duran ........................ | 455/461 |
| 6,130,935 A | * | 10/2000 | Shaffer et al. .............. | 379/127 |
| 6,134,311 A | * | 10/2000 | Ekstrom ..................... | 379/201 |
| 6,208,854 B1 | * | 3/2001 | Roberts et al. ............. | 455/417 |
| 6,252,953 B1 | * | 6/2001 | Gruchala et al. ........... | 379/207 |
| 6,687,360 B2 | * | 2/2004 | Kung et al. ............. | 379/211.02 |
| 6,718,026 B1 | * | 4/2004 | Pershan et al. ........ | 379/211.01 |

* cited by examiner

*Primary Examiner*—Rexford Barnie
(74) *Attorney, Agent, or Firm*—Woodcock Washburn LLP

(57) ABSTRACT

A method and system are disclosed for implementing a tele-work service in an advanced intelligent network comprising a first service switching point connected to a first telephone station; a second service switching point connected to a second telephone station; and a service control point having a database that receives routing information for specifying routing of calls originally directed to the first telephone station and billing information for specifying billing of calls placed from the second telephone station. The method comprises the following steps: at the first service switching point, upon receipt of a call directed to the first telephone station, forwarding a request for routing information to the service control point; at the service control point, forwarding routing information to the first service switching point; at the first service switching point, routing a call originally directed to the first telephone station either to the first telephone station or the second telephone station depending upon the routing information; at the second service switching point, upon receipt of a call from the second telephone station, forwarding a request for billing information to the service control point; at the service control point, forwarding billing information to the second service switching point; and at the second service switching point, billing a call received from the second telephone station to either the first telephone station or second telephone station based upon the billing information.

36 Claims, 3 Drawing Sheets

SYSTEM AND METHOD FOR AUTOMATED TELE-WORK SERVICE

FIELD OF THE INVENTION

The present invention generally relates to the field of telecommunications and to an apparatus and method for managing telephony-based services. More particularly, the present invention relates to an intelligent or advanced application, such as an Advanced Intelligent Network (AIN) application, for an automated tele-work service within a telephone network.

BACKGROUND OF THE INVENTION

In today's work environment, many workers are splitting time between working at home and in the office. Although working at home can be convenient, there are problems associated with such an arrangement. Notably, when a person works from home, they are not available at the work site to answer his/her phone. Typically, a person working from home must call the work site to retrieve messages. While a person may check for messages several times throughout the day, there are situations that demand immediate attention and for which any delay, such as the lag time between when a message is received and when a person checks messages, is unacceptable. Accordingly, there is a need in the art for a system that allows a person to receive calls at home that were originally directed to his/her business phone.

An employee that works from home must contend with the additional complication of insuring that the employer is billed for work-related calls that are made from the home phone. This complication can sometimes be resolved by charging business calls made from the home to business issued calling cards and credit cards. This method of payment, however, can become more tiresome especially when the employee makes numerous calls. Another solution has been to have the employer reimburse the employee. The reimbursement process, however, is typically time consuming and inconvenient for the employee. Thus, there has been no truly convenient solution proposed to deal with billing of work related calls made from the home.

In recent years, a number of new telephone service features have been provided by an AIN. The AIN evolved out of a need to increase the capabilities of the telephone network architecture in order to meet the growing needs of telephone customers or users. The AIN architecture generally comprises two networks, a data-messaging network and a trunked communications network. The trunked communications network handles voice and data communications between dispersed network locations, whereas the data messaging network is provided for controlling operations of the trunked communications network.

While prior telephone systems have addressed numerous shortcomings in the art, these systems have failed to create the situation wherein working at home is functionally transparent to both the business and the worker. Specifically, prior systems have failed to provide for forwarding of calls originally directed to the business phone to the home and simultaneously billing calls placed from the home to the work number. Such a system would be highly desirable for both businesses and workers. The present invention is directed to such a solution.

SUMMARY OF THE PRESENT INVENTION

According to an aspect of the invention, there is provided a system for selectively forwarding calls originally directed to a business phone to a home phone and billing calls placed from the home phone as if placed from the business phone. Calls that are redirected from the business phone to the home phone are identified with a distinctive ringing pattern.

A system in accordance with the invention includes a first service switching point connected to a first telephone station, such as a business phone; a second service switching point connected to a second telephone station, such as a home phone; and a service control point communicating with the first service switching point and the second service switching point. The service control point contains a database that receives routing information for specifying routing of calls originally directed to the first telephone station and billing information for specifying billing of calls placed from the second telephone station.

The first service switching point is adapted to poll the service control point for routing information upon receipt of a call directed to the first telephone station. The second service switching point is adapted to poll the service control point for billing information upon receipt of calls placed from the second telephone station. Thus, the first service switching point, upon receipt of a call directed to the first telephone station, polls the service control point, and depending upon the information received therefrom, forwards the call either to the first telephone station or to the second telephone station. If the call is routed to the second telephone station, a distinctive ring is assigned to the call. The second service switching point, upon receipt of a call originating from the second telephone station, polls the service control point, and depending upon the information received therefrom, bills the call either to the first telephone station or the second telephone station.

In accordance with another aspect of the invention, there is provided a method of providing a tele-work service in an advanced intelligent network. The method comprises the following steps: at a first service switching point, upon receipt of a call directed to a first telephone station, forwarding a request for routing information to a service control point; at the service control point, forwarding routing information to the first service switching point; at the first service switching point, routing a call originally directed to the first telephone station either to the first telephone station or the second telephone station depending upon the routing information; at a second service switching point, upon receipt of a call from the second telephone station, forwarding a request for billing information to the service control point; at the service control point, forwarding billing information to the second service switching point; and at the second service switching point, billing a call received from the second telephone station to either the first telephone station or second telephone station based upon the billing information.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

According to an aspect of the present invention, an apparatus and method for managing a tele-work service may be implemented using an AIN or AIN-type network. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks, and other advanced or intelligent networks and arrangements may be used to implement the invention.

Figure 1:
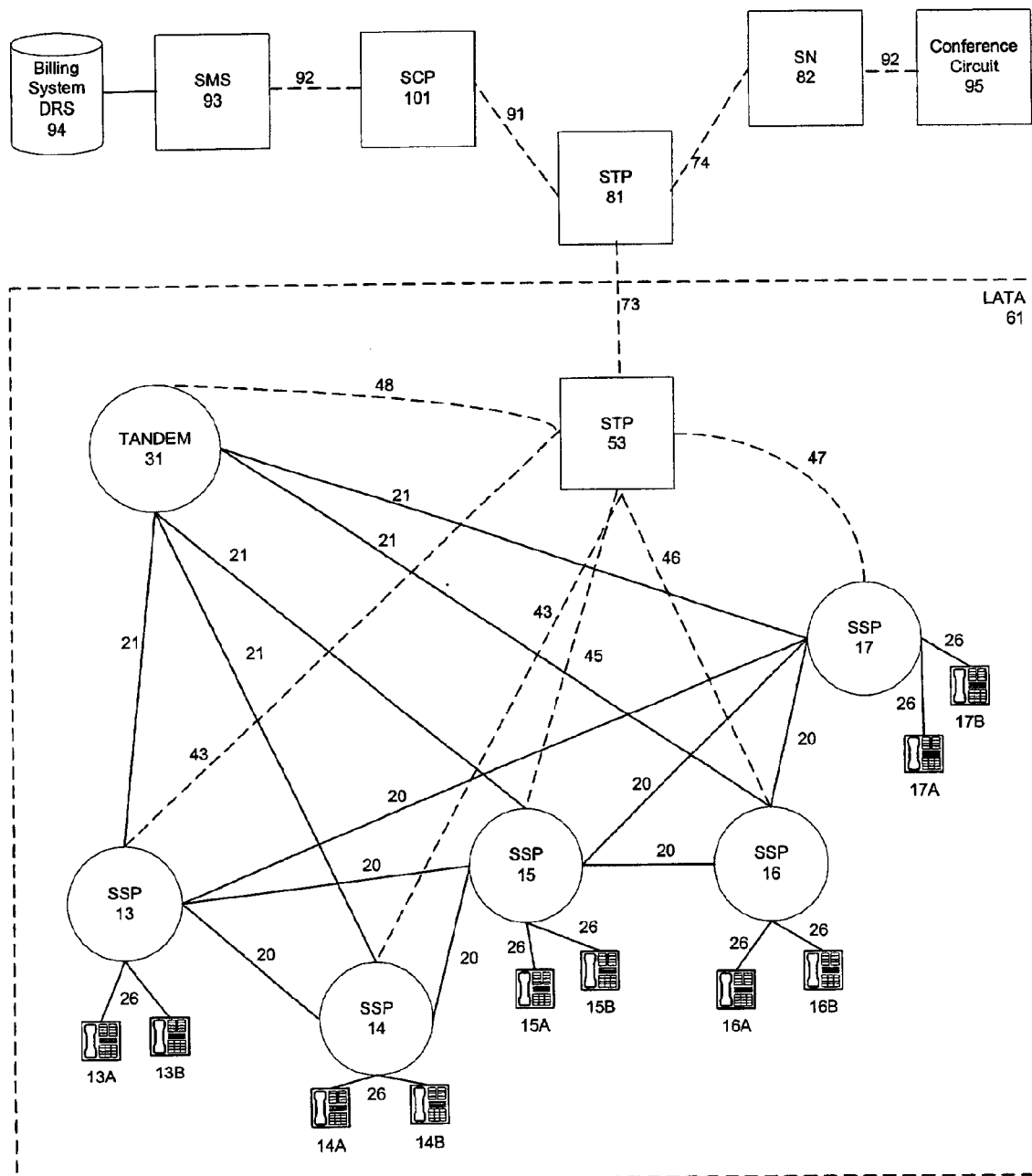
FIG. 1 illustrates, in a general block diagram form, an AIN-based system for implementing intelligent network management features, in accordance with an embodiment of the present invention.

Referring now to the accompanying drawings, FIG. 1 illustrates an AIN-based network arrangement incorporating the various features of the invention, as further described below. In the embodiment of FIG. 1, a telephone network within local access and transport area (LATA) 61 is provided that defines a calling service area. LATA 61 includes stations, e.g., stations 13A, 13B, 14A, 14B, 15A, 15B, 16A, 16B, 17A and 17B, and corresponding switches, e.g., service switching points (SSP) (also known as central offices (CO)) 13, 14, 15, 16 and 17. COs 13, 14, 15, 16 and 17 may comprise, for example, 1AESS or 5ESS switches. These may be manufactured by, for example, Lucent Technologies, Inc. or Nortel.

In the example shown in FIG. 1, each switch may include different types of facilities and/or triggers. SSPs 13–17 are each programmable switches which: recognize AIN-type calls, launch queries to service control point (SCP) 101, and receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

As further shown in FIG. 1, either a direct route or a tandem route may exist between all switches. In LATA 61, direct trunks 20 may exist between SSP 13, SSP 14, SSP 15, SSP 16 and SSP 17. Assuming LATA 61 to be a large service area, direct trunks 20 may not be available between each switch, either due to geographical limitations or due to excessive traffic. For example, SSP 13 may alternatively use tandem trunk 21 to a tandem switch 31 and may use trunk 21 to SSP 17 to terminate an offered call. This alternative path may be an overflow route for traffic that cannot find room on trunk 20 between SSP 13 and SSP 17. Trunks 21 and 22 may be either SS7 controlled multi-frequency trunks (MF), or primary rate interface (PRI) trunks. The type of trunk will be in accordance with both the sending and receiving SSP to which it is connected. If either of the SSPs is a 1AESS type switch, the trunk will be an SS7 controlled MF type trunk as the 1AESS is not capable of supporting PRI trunks. However, if both the sending and receiving switches are either a DMS-100 switch or a 5ESS switch, the trunk may be either an SS7controlled MF type trunk or PRI type trunk.

Each office equipped as an AIN SSP may allow normal switch processing to be suspended at specific points in a call so that the switch may send an AIN message query to SCP 101. Alternatively, SCP 101 may comprise an integrated service control point (ISCP). Service control point 101 may execute software based service logic and return call processing instructions to the triggering AIN SSP. New services may be provisioned by assigning AIN SSP triggers to customer lines, trunks, and/or NANP telephone numbers.

As described above, within LATA 61 is a tandem switch 31 that is connected to SSPs 13–17. Tandem switch 31 is coupled to SSPs 13–17 of LATA 61 by trunks 21. Trunks 21 may interconnect tandem switch 31 with each SSP within LATA 61 for routing of telephone calls. However, trunks 21 may also be used to connect tandem switch 31 to, e.g., toll calls that terminate on SSPs (not shown) outside LATA 61, and calls originating outside of LATA 61 but terminating on an SSP within LATA 61.

As noted above, SCP 101 may comprise an integrated service control point (ISCP). The ISCP is an integrated system which may include a service management system (SMS 93), a data and reports system (DRS 94), a programmable service control point (SCP), and a service creation environment (SCE). The SCE may be provisioned as a terminal implemented to work with SMS to create, modify, and load services into the SCP database. The SCE may comprise, for example, a programming environment (such as SPACE$^{SM}$) for creating and provisioning services. The SCP may execute software-based service logic and return call routing instructions to the triggering SSPs. SMS 93 may be provided for administrative purposes to synchronize customer CPR and data on the mated pair of ISCPs that SCP 101 represents. The DRS 94 may be provided for compiling call information to be used for billing and administrative purposes. A service node (SN) 82 is an interactive data system which acts as a switch to transfer calls. SN 82 may be a Lucent Technologies Star Server FT Model 3200 or Model 3300, although others may be employed without departing from the scope of the invention. SN 82 provides interactive help, collects voice information from participants in a call, may track calls within a conference circuit 95, and provides notification functions. Conference circuit 95 includes a plurality of ports which are used to connect all parties to a conference call. Conference circuit 95 reserves ports and numbers, as necessary, in order to connect the participants of a particular conference call, as will be described in further detail below.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 43, 44, 45, 46, 47, 48, 73 and 91 among each SSP, tandem switch 31, and SCP 101. The data messages may be formatted in accordance with the Transaction Capabilities Applications Part (TCAP). Alternatively, ISDN Users Part (ISUP) may be used for signaling purposes between, for example, SSPs 13–17. In such a case, the SSPs may be equipped with the capability to map appropriate data between TCAP and ISUP protocols, and vice versa. The telephone network employs an upper-level software controlled network through the Signaling Transfer Points (STPs) and the SCP (and/or ISCP). The software presides over the hardware to check the call route and the availability of connection prior to hardware connection.

Accordingly, the connections by links 43–48, link 73, and link 91 through STPs 53 and 81 are for signaling purposes and allow SSPs 13–17 to send and receive messages to and from SCP 101 via STPs 53 and 81. As shown for example in FIG. 1, a local STP 53 may act as the data messaging control point for LATA 61. That is, all data messages from SSPs within LATA 61 or directed to SSPs within LATA 61 may be transmitted through STP 53. Accordingly, CCS links 43–48 are shown establishing a data link between STP 53 and either tandem switch 31, SSP 13, SSP 14, SSP 15, SSP 16 or SSP 17. Further, one or more regional STPs may be provided for data messaging with the LATA. In FIG. 1, regional STP 81 is illustrated as receiving and transmitting data messages with LATA 61 by connecting to STP 53 by line 73 and connecting to SCP 101 by link 91.

The present invention provides a system within the AIN or AIN-type environment for a tele-work phone system. In accordance with the invention, when the tele-work service is activated, calls originally directed to a business phone, say for example telephone station 15A in FIG. 1, are re-routed to a home telephone, say for example telephone station 16A of FIG. 1, and calls placed from home telephone 16A are billed as if placed from the business phone 15A. Furthermore, calls originally directed to business phone 15A and which are re-directed to home phone 16A, are identified with a distinctive ring pattern to identify that the call was originally directed to business phone 15A. Of course, if the tele-work service is not activated, calls directed to business phone 15A are routed through to business phone 15A and calls placed from home phone 16A re billed to the home phone 16A.

Figure 2:
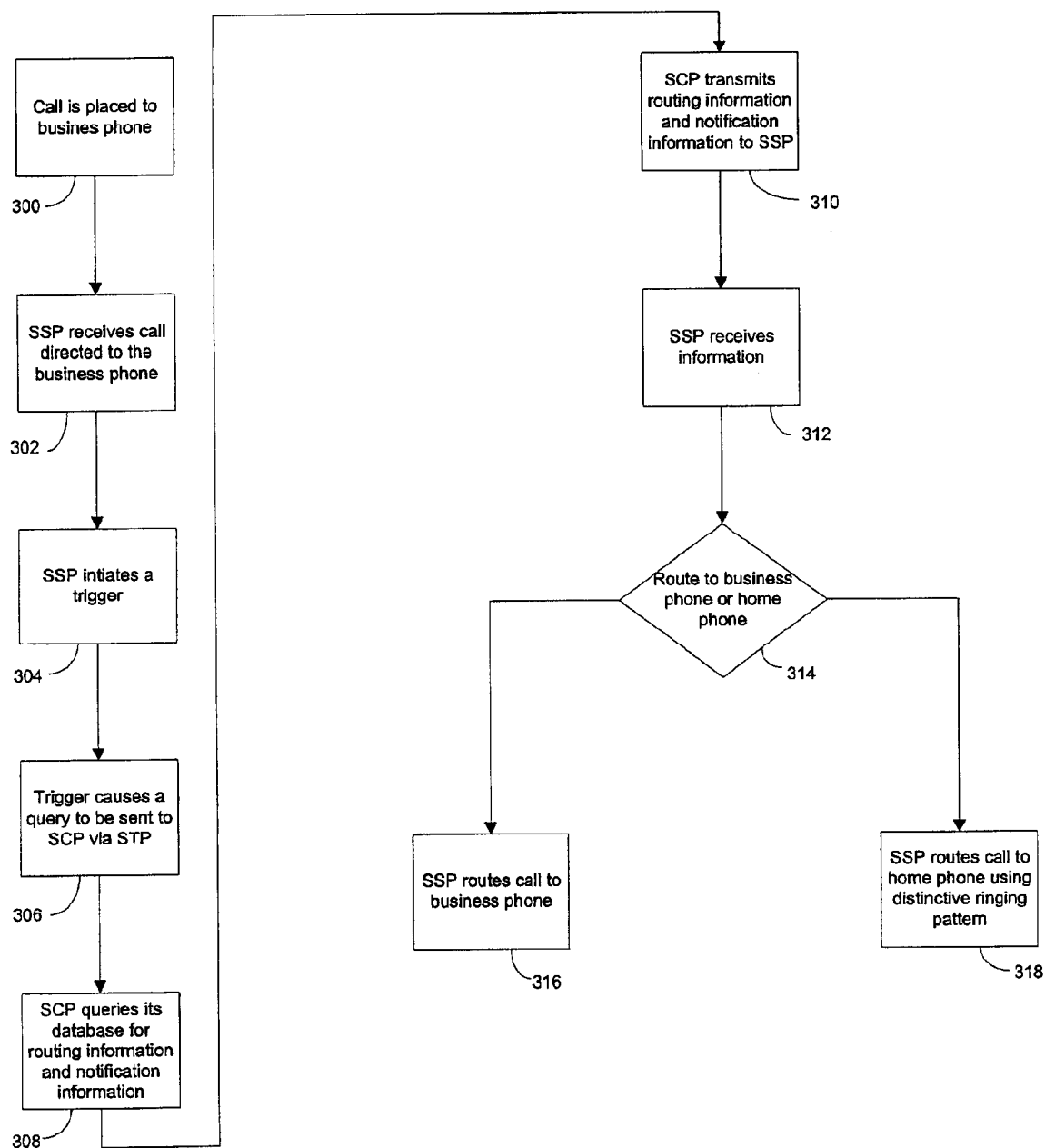
FIG. 2 illustrates an exemplary flow diagram of call processing, according to an aspect of the present invention.

Referring now to the FIG. 2, there is illustrated an exemplary overview of the call flow logic according to an aspect of the present invention. As noted above, the call flow logic of the present invention is designed to operate with AIN protocols.

According to an aspect of the invention, when the tele-work service is activated, calls that are directed to business phone 15A are redirected to home phone 16A. As shown in FIG. 2, beginning at step 300 a call is placed to business phone 15A. At step 302, SSP 15 receives the call. At step 304, SSP 15 recognizes the call is directed to business phone 15A and initiates a trigger. The trigger may be any of several different types of triggers such as, for example, a TAT trigger or customized dialing plan (CDP) trigger. At step 306, the trigger causes a query to be sent to SCP 101 via STPs 53 and 81. The query includes information identifying business phone 15A.

SCP 101 contains a database, such as for example a relational database system. The database contains routing information specifying whether the call originally directed to business phone 15A is to be re-routed to home phone 16A or should be allowed to continue through to business phone 15A. When the tele-work service has been activated, the information in the database identifies that the call should be re-routed to home phone 16A. Of course, in the case the tele-work service has not been activated, the information in the database identifies that the call should be routed to business phone 15A. Thus, referring to FIG. 2, at step 308 in response to the request from SSP 15, SCP 101 queries its database to identify where to route the call and if the call is to be routed to home phone 16A, and identifies that the call is to receive a distinctive ringing pattern so as to identify the call as resulting from the tele-work service.

At step 310, SCP 101 transmits routing information and any necessary notification information to SSP 15. Specifically, the data routed to SSP 15 may include the telephone number of the telephone station to which the call should be forwarded along with an indication of whether a distinctive ringing pattern is to be used when completing the call. At step 312, the routing and notification information are received at SSP 15. At step 314, SSP 15 uses the information received from SCP 101 to identify where to route the call. If the information identifies business phone 15A, at step 316, the call is routed to business phone 15A. If it is determined at step 314 that the call should be routed to home phone 16A, at step 318, SSP 15 forwards the call to home phone 16A with a distinctive ringing pattern.

Figure 3:
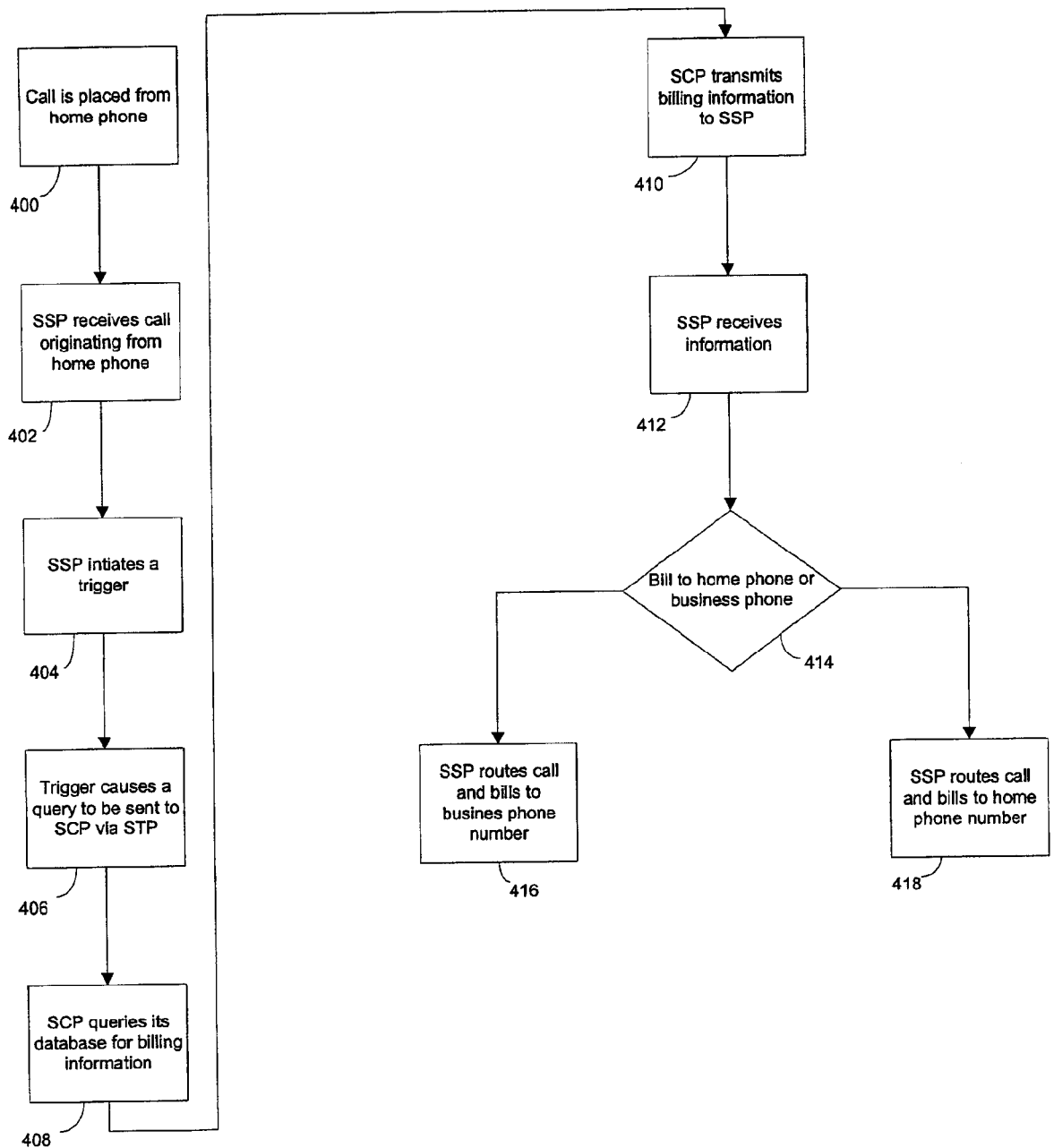
FIG. 3 illustrates an exemplary flow diagram of call processing, according to an aspect of the present invention.

According to another aspect of the invention, when the tele-work service has been activated, calls placed from home phone 16A are billed as though they were placed from business phone 15A. Of course, when the tele-work service is not active, calls placed from home phone 16A are billed to home phone 16A. FIG. 3 illustrates the call flow according to this aspect of the invention. At step 400, a call is placed from home phone 16A. At step 402, the call is received at SSP 16. In response to the call, SSP 16 initiates a trigger at step 404. The trigger may be one of several different types of triggers including a TAT trigger or CDP trigger. At step 406, the trigger causes a query to be sent to SCP 101 via STP 81. The query includes information identifying that a call is being paced from home phone 16A.

The SCP 101 database contains billing information identifying to whom calls should be billed. Specifically, when the tele-work service is activated, the billing information specifies that calls placed from home phone 16A should be billed as if placed from business phone 15A. If the tele-work service has not been activated, the billing information specifies that calls placed from home phone 16A should also be billed to home phone 16A. At step 408, SCP 101 queries the database billing information to identify whether the call placed from home phone 16A should be billed to business phone 15A or home phone 16A. At step 410, SCP 101 transmits the billing information to SSP 16 which is received by SSP 16 at step 412.

At step 414, SSP 16 determines, based upon the billing information received from SCP 101, whether to bill the call to business phone 15A or home phone 16A. If the tele-work service is active, as indicated by the billing information, at step 416, SSP 16 routes the call and bills the charges for the call, using normal billing processing methods, to business phone 15A. If the tele-work service is not active as indicated by the billing information, at step 418, SSP 16 routes the call and bills the charges for the call to home phone 16A.

The tele-work service may be selectively activated, i.e., it can be turned off and on. According to one implementation, activating the tele-work service may involve dialing an activation code. For example, the tele-work service might be turned on by dialing *88 or some other unique code that has been associated with the service. Deactivating the service might involve dialing the same or similar code. The tele-work service might also be invoked using a menu-driven voice system. Such a system might be implemented using SN 82.

As described above, the present invention provides a convenient system for implementing a tele-work service. The system allows employees that are working from home to be more responsive to telephone calls and therefore to better perform their work responsibilities. Further, the tele-work service insures that employees working from home are not billed for work related calls and thereby frees employees from the inconveniences associated with being reimbursed by the employer. Accordingly, the systems and methods of the present invention represent a significant improvement in the art.

It is noted that the written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CO—Central Office
CPR—Call Processing Record
CPN—Calling Party Number
DLN—Dialed Line Number
DRS—Data and Reports System
EO—End Office
ISCP—Integrated Service Control Point
ISUP—ISDN Users Part
LATA—Local Access and Transport Area
MF—Multi-Frequency
NANP—North American Numbering Plan
NPA—Numbering Plan Area
NXX—Central Office Code
PRI—Primary Rate Interface
PSTN—Public Switched Telephone Network
SCE—Service Creation Environment
SCP—Service Control PointSMS-Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. For example, the functionality described above with reference to SSP's 15 and 16 might be combined in a single SSP. Alternatively, the functionality that has been described as being performed by an SCP might be performed by another network element such as, for example, STP or SSP. Those skilled in the art, having the benefit of the teachings of this specification, may effect numerous modifications thereto and changes may be made without departing from the scope and spirit of the invention in its aspects.

What is claimed is:

1. A system for managing calls within a telephone network, comprising:
   a first service switching point in communication with a first telephone station;
   a second service switching point in communication with a second telephone station;
   a service control point communicating with said first service switching point and said second service switching point, and containing a database that receives routing information for specifying routing of calls originally directed to the first telephone station, billing information for specifying billing of calls placed from the second telephone station, and notification information identifying a distinctive ringing pattern for calls originally directed to said first telephone station but which are re-routed to said second telephone station,
   wherein said first service switching point is adapted to poll said service control point for routing information and notification information upon receipt of a call directed to the first telephone station, and wherein said second service switching point is adapted to poll said service control point for billing information upon receipt of calls placed from the second telephone station.

2. The system as recited in claim 1, wherein said routing information specifies whether an incoming call to said first telephone station should be forwarded to the first telephone station or the second telephone station.

3. The system of claim 1, wherein said billing information specifies whether an outgoing call from said second telephone station should be charged to said second telephone station or said first telephone station.

4. The system of claim 1, wherein said first switching point routes calls originally directed to said first telephone station based upon said routing information.

5. The system of claim 1, wherein said second switching point charges calls originating from said second telephone station based upon said billing information.

6. The system of claim 4, wherein said first switching point routes calls originally directed to said first telephone station, to the first telephone station based upon said routing information.

7. The system of claim 4, wherein said first switching point routes calls originally directed to said first telephone station, to the second telephone station based upon said routing information.

8. The system of claim 5, wherein said second switching point charges calls originating from said second telephone station to the second telephone station based upon said billing information.

9. The system of claim 5, wherein said second switching point charges calls originating from said second telephone station to the first telephone station based upon said billing information.

10. The system of claim 1, wherein said first switching point causes calls which were originally directed to said first telephone station and which are rerouted to said second telephone station based upon said routing information, to have a distinctive ring at said second telephone station.

11. A system for managing calls in a telephone network, comprising:
    a first service switching point communicating with a first telephone station;
    a second service switching point communicating with a second telephone station; and
    a service control point communicating with said first service control point and said second service control point, said service control point having a database including information specifying where to rout calls, information specifying to which number a calls should be billed, and information identifying a distinctive ringing pattern for calls originally directed to one of said first telephone station and second telephone station but which are re-routed to another of said first telephone station and said second telephone station,
    wherein upon receipt of a call destined for said first telephone station, said first service switching point polls said service control point for information specifying where to route the call destined for said first telephone station and information specifying a distinctive ringing pattern, routes the call to either said first telephone station or said second telephone station based upon the information from said service control point, and causes a ringing pattern to be created based upon the information specifying a distinctive ringing pattern, and wherein upon receipt of a call originating from said second telephone station, said second service switching point polls said service control point for information specifying to which service station the call is to be billed, and bills the call to either said first telephone station or said second telephone station based upon the information from said service control point.

12. In an advanced intelligent network comprising a first service switching point communicating with a first telephone station, a second service switching point communicating with a second telephone station, and a service control point communicating with said first service switching point and said second service switching point, and containing a database that receives routing information for specifying routing of calls directed to the first telephone station, billing information for specifying billing of calls placed from the second telephone station, and notification information for identifying a ringing pattern for calls originally directed to one of the first telephone station but which are re-routed to the second telephone station, a method of managing telephone calls, comprising:

at the first service switching point, forwarding a request for routing information to the service control point;

at the first service switching point, forwarding a request for notification information to the service control point;

at the service control point, forwarding routing information to the first service switching point;

at the service control point, forwarding notification information to the first service switching point;

at the first service switching point, routing a call originally directed to the first telephone station based upon the routing information;

at the first service switching point, assigning a distinctive ringing pattern to a call originally directed to the first telephone station and which is rerouted to the second telephone station;

at the second service switching point, forwarding a request for billing information to the service control point;

at the service control point, forwarding billing information to the second service switching point;

at the second service switching point, billing a call received from the second telephone station based upon the billing information.

13. The method of claim 12, wherein said routing information indicates whether an incoming call originally directed to the first telephone station is to be forwarded to the first telephone station or to the second telephone station.

14. The method of claim 12, wherein the act of routing a call originally directed to the first telephone station based upon the routing information, comprises routing a call to the first telephone station.

15. The method of claim 12, wherein the act of routing a call originally directed to the first telephone station based upon the routing information, comprises routing a call to the second telephone station.

16. The method of claim 12, wherein the billing information identifies whether a call placed from the second telephone station is to be charged to the second telephone station or the first telephone station.

17. The method of claim 12, wherein the act of charging a call received from the second telephone station based upon the billing information comprises billing a call to the second telephone station.

18. The method of claim 12, wherein the act of charging a call received from the second telephone station based upon the billing information comprises billing a call to the first telephone station.

19. A method of managing calls in a telephone network, comprising:

upon receiving a call directed to a first telephone station, polling a service control point for information specifying whether to forward the call to the first telephone station or to a second telephone station, and polling a service control point for information specifying a distinctive ringing pattern for calls originally directed to the first telephone station but which are re-routed to the second telephone station;

forwarding the call to either the first telephone station or the second telephone station as specified by the information from the service control point, and assigning a ringing pattern to the call based upon the information specifying a distinctive ringing pattern; and upon receiving a call originating at a second telephone station, polling a service control point for information specifying whether to charge the call to the first telephone station or the second telephone station.

20. A device, comprising:

information for specifying routing of calls originally directed to a first terminal;

billing information for specifying billing of calls placed from a second terminal; and notification information identifying a distinctive signal for calls originally directed to the first terminal but which are re-routed to the second terminal, said service control point adapted to field requests for routing information and notification information upon receipt of a call directed to the first terminal, and adapted to field requests for billing information upon receipt of calls placed from the second terminal.

21. The device as recited in claim 20, wherein said routing information specifies whether an incoming call to said first terminal should be forwarded to the first terminal or the second terminal.

22. The device of claim 20, wherein said billing information specifies whether an outgoing call from the second terminal should be charged to the second terminal or the first terminal.

23. The device of claim 20, wherein said notification information identifying a distinctive signal for calls originally directed to the first terminal but which are re-routed to the second terminal comprises information identifying a distinctive ringing pattern.

24. A system for managing calls within a telephone network, comprising:

a first service switching point in communication with a first telephone station;

a second service switching point in communication with a second telephone station;

a service control point communicating with said first service switching point and said second service switching point, and containing a database that receives routing information for specifying routing of calls originally directed to the first telephone station, billing information for specifying billing of calls placed from the second telephone station, and notification information identifying a distinctive signal for calls originally directed to said first telephone station but which are re-routed to said second telephone station, wherein said first service switching point is adapted to poll said service control point for routing information and notification information upon receipt of a call directed to the first telephone station, and wherein said second service switching point is adapted to poll said service control point for billing information upon receipt of calls placed from the second telephone station.

25. The system as recited in claim 24, wherein said routing information specifies whether an incoming call to said first telephone station should be forwarded to the first telephone station or the second telephone station.

26. The system of claim 24, wherein said billing information specifies whether an outgoing call from said second telephone station should be charged to said second telephone station or said first telephone station.

27. The system of claim 24, wherein said first switching point routes calls originally directed to said first telephone station based upon said routing information.

28. The system of claim 24, wherein said second switching point charges calls originating from said second telephone station based upon said billing information.

29. The system of claim 27, wherein said first switching point routes calls originally directed to said first telephone station, to the first telephone station based upon said routing information.

30. The system of claim 27, wherein said first switching point routes calls originally directed to said first telephone station, to the second telephone station based upon said routing information.

31. The system of claim 28, wherein said second switching point charges calls originating from said second telephone station to the second telephone station based upon said billing information.

32. The system of claim 28, wherein said second switching point charges calls originating from said second telephone station to the first telephone station based upon said billing information.

33. The system of claim 24, wherein said first switching point causes calls which were originally directed to said first telephone station and which are rerouted to said second telephone station based upon said routing information, to have a distinctive signal at said second telephone station.

34. The system of claim 24, wherein the signal notification information identifying a distinctive signal for calls originally directed to said first telephone station but which are re-routed to said second telephone station comprises information specifying a distinctive ringing pattern.

35. A method of managing calls in a telephone network, comprising:

upon receiving a call directed to a first telephone station, polling a service control point for information specifying whether to forward the call to the first telephone station or to a second telephone station, and polling a service control point for information specifying a distinctive signal for calls originally directed to the first telephone station but which are re-routed to the second telephone station;

forwarding the call to either the first telephone station or the second telephone station as specified by the information from the service control point, and assigning a distinctive signal to the call based upon the information specifying a distinctive identifier; and upon receiving a call originating at a second telephone station, poling a service control point for information specifying whether to charge the call to the first telephone station or the second telephone station.

36. The method of claim 35, wherein said information specifying a distinctive signal comprises information specifying a distinctive ringing pattern.

\* \* \* \* \*